United States Patent Office 3,714,849
Patented Feb. 6, 1973

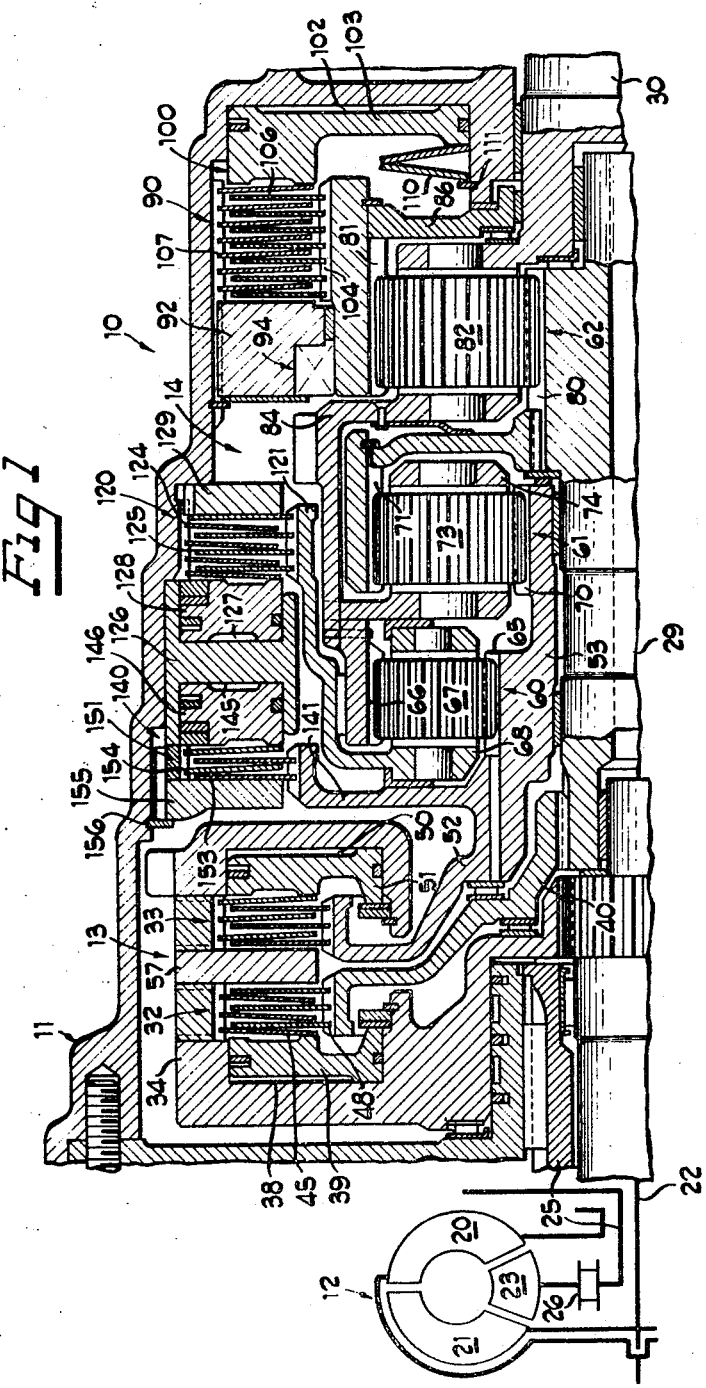

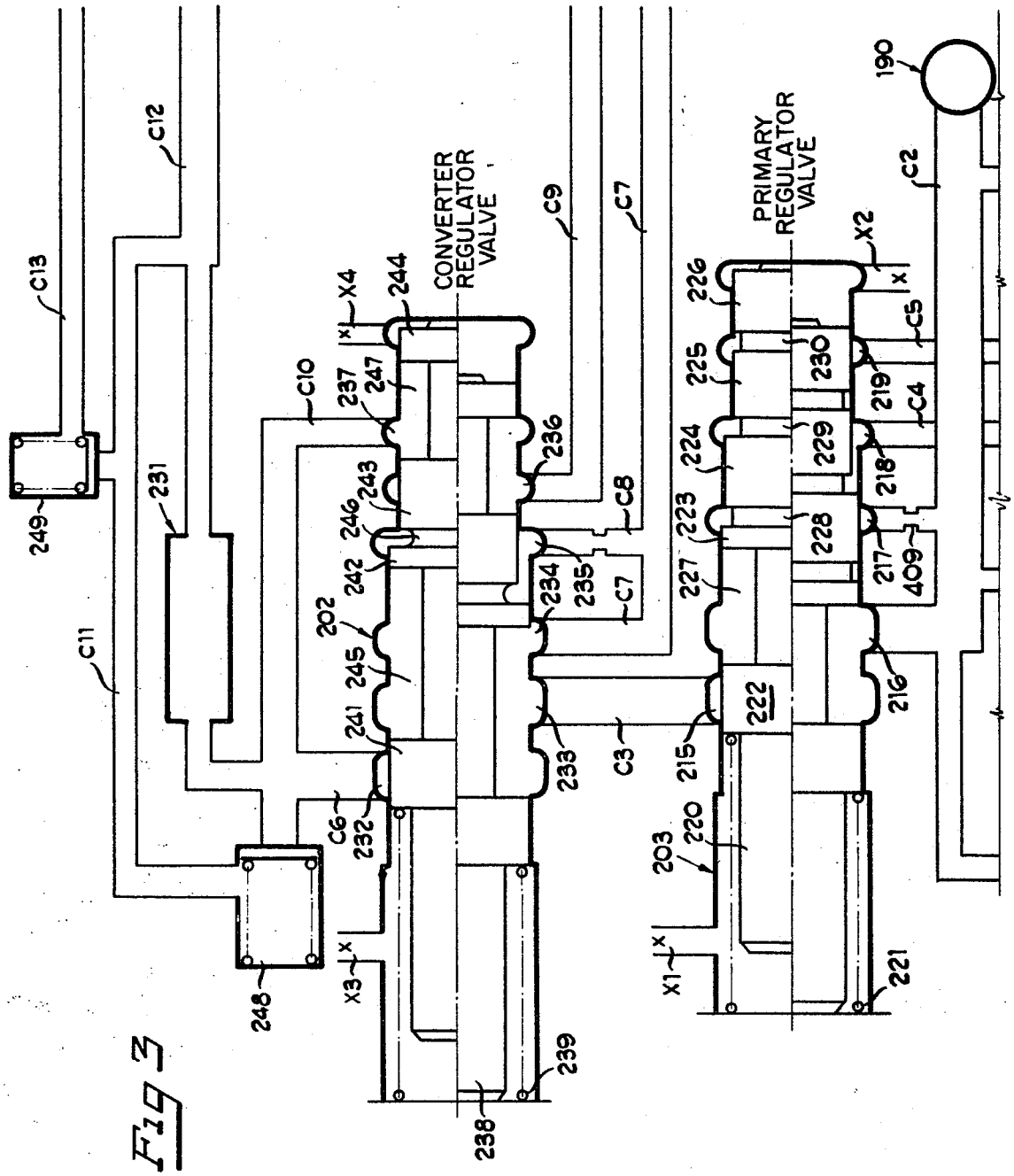

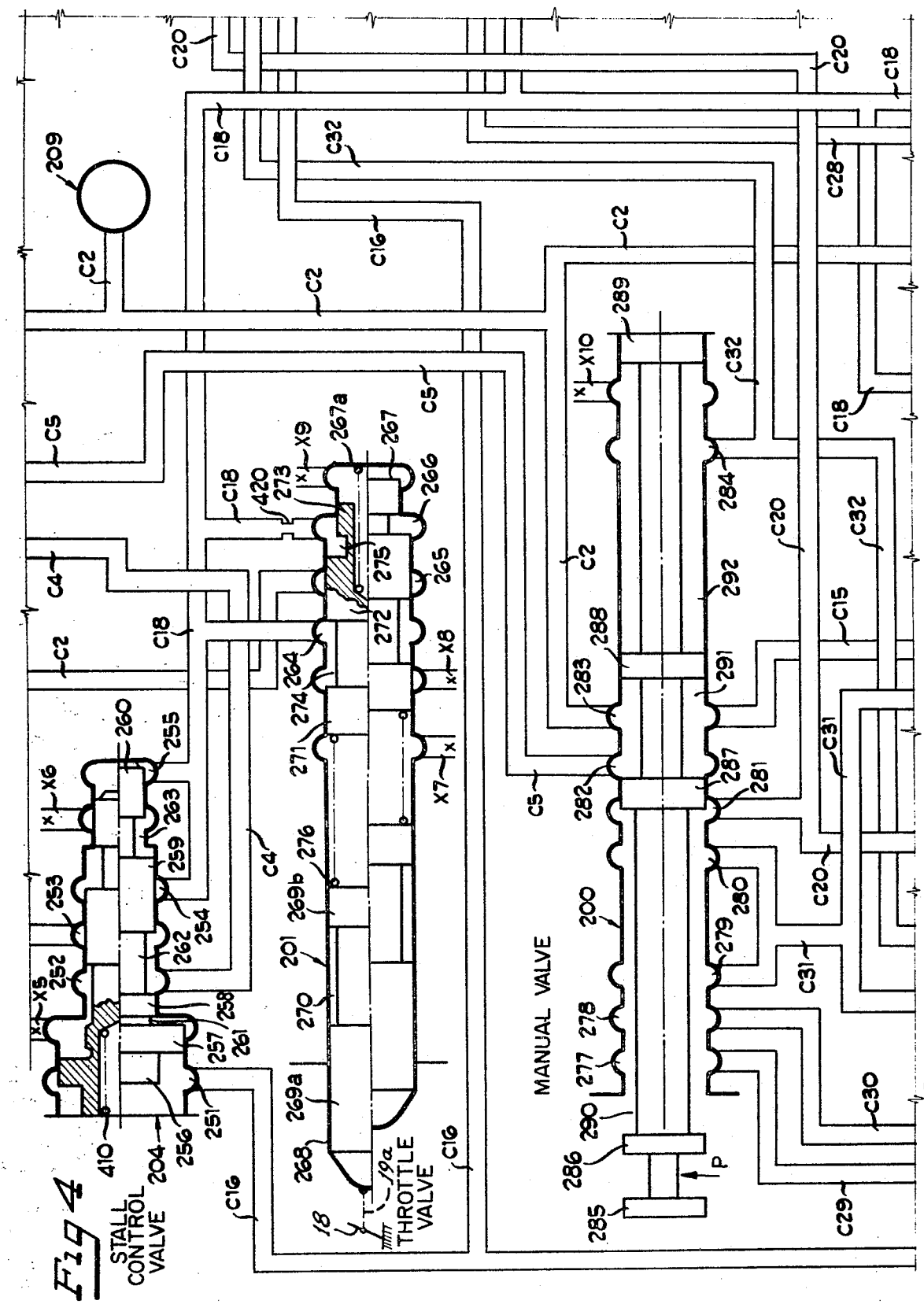

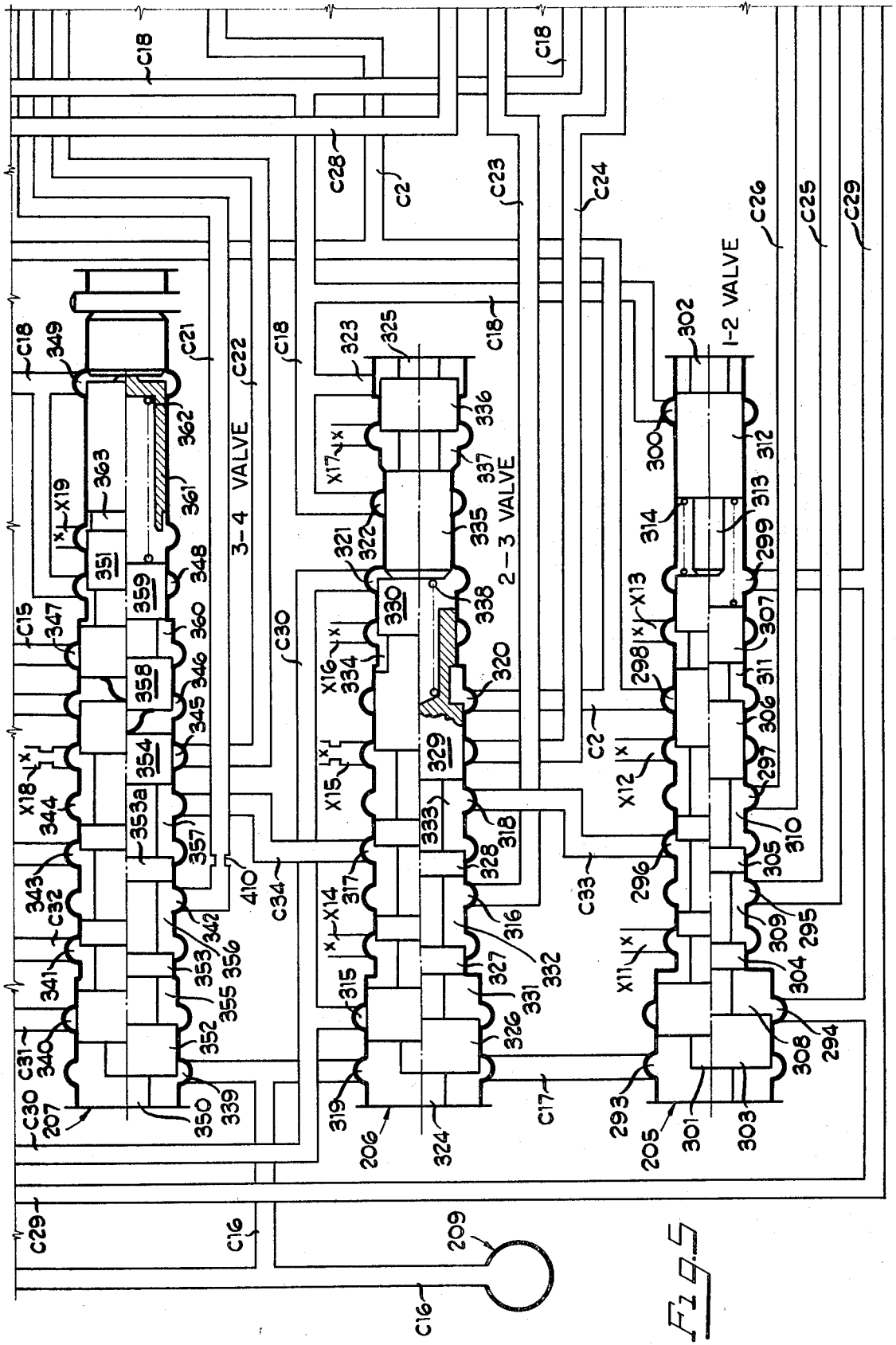

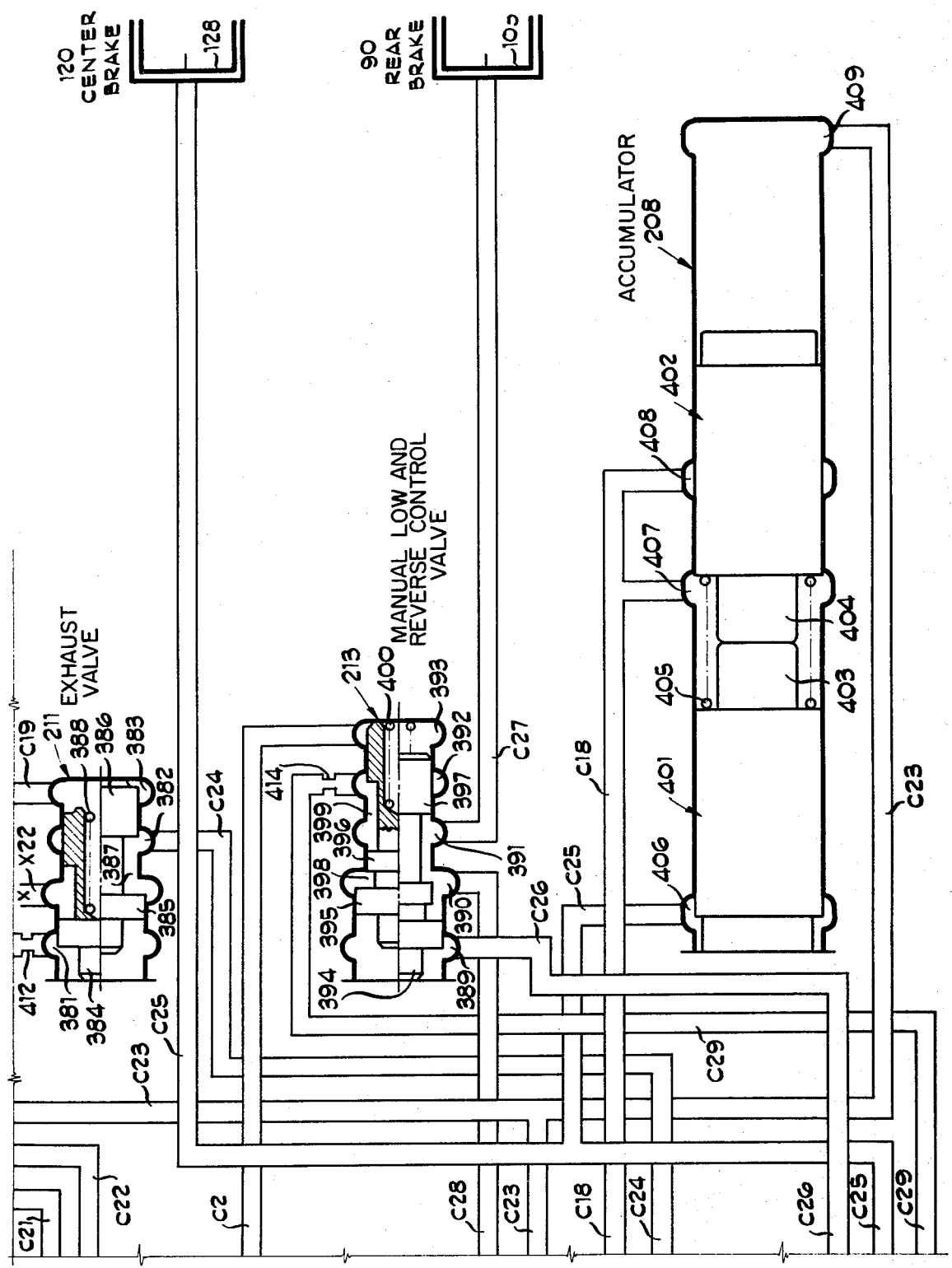

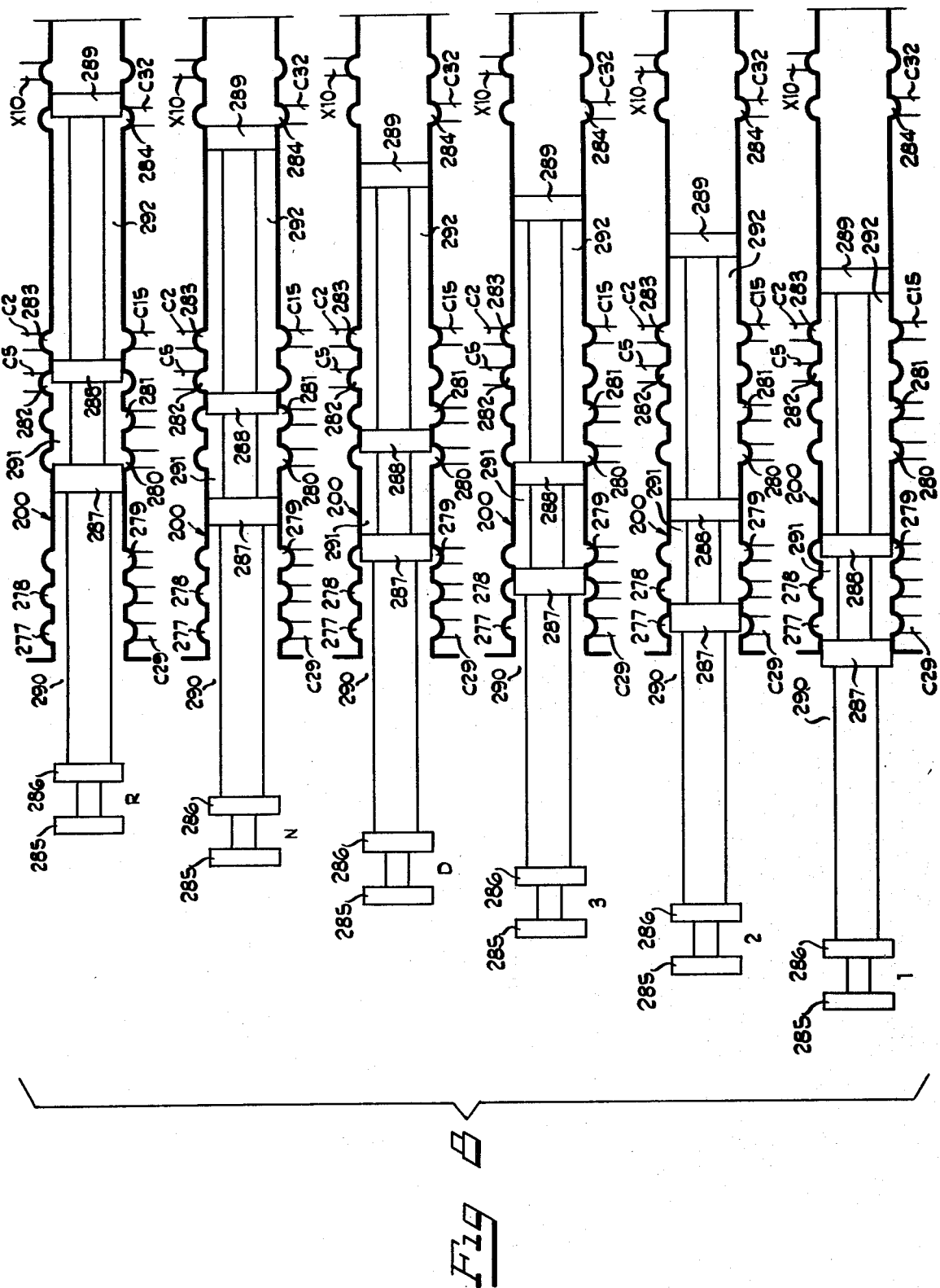

3,714,849
AUTOMOTIVE TRANSMISSION
James G. Smith, Muncie, Ind., assignor to Borg-Warner Corporation, Chicago, Ill.
Filed Dec. 21, 1970, Ser. No. 99,803
Int. Cl. B60k 21/00; F16h 57/10
U.S. Cl. 74—869                                    16 Claims

ABSTRACT OF THE DISCLOSURE

A hydraulic control system for an automatic transmission having a hydraulic converter, fluid pressure operated friction engaging devices to provide a plurality of speed ratio drive trains upon serial automatic actuation of shift valves to upshifted positions by vehicle speed-responsive governor pressure and downshiftable by throttle-responsive pressure, a fluid-operated friction brake for low speed ratio, and a control valve for the brake and a manual valve to provide fluid pressure to the brake only in the downshifted position of the shift valves; an accumulator to control engaging fluid pressure of the engaging devices; and a stall control valve functioning to change the effective regulated output pressure from a regulator valve and to provide increased actuating fluid pressure during torque multiplication of the torque converter.

SUMMARY OF INVENTION

This invention provides a hydraulic control system for an automatic transmission having a source of fluid pressure, a plurality of fluid pressure operated friction engaging devices for establishing various drives ratios through the transmission, a plurality of shift valves automatically operative by successive upshifting and downshifting movements to control a connection between said source and certain of said engaging devices to provide the drive ratios under the control of throttle-responsive pressure acting on the shift valves tending to downshift the valves and vehicle speed-responsive governor pressure acting to upshift the valves, a control valve shiftable to connect said source to another of said engaging devices to establish a low speed drive ratio, and a manual valve movable to a first position to connect said source to said shift valves for automatic upshifting and downshifting as controlled by throttle and governor pressures, and movable to a second position to disconnect said source from said certain engaging devices and to connect said source through one of said downshifted valves, to move said control valve to connect said source through said control valve to said other engaging device to establish a low speed ratio.

The invention further provides a hydraulic control system for an automotive transmission having a source of fluid pressure including an accumulator for controlling the pressure applied to the engaging devices of the transmission by regulating the pressure in conformance to variations in the throttle pressure.

The accumulator regulates the fluid pressure applied to the engaging devices in a manner so as to delay the release of pressure on the engaging device being released, the accumulator having a chamber with ports at opposite ends thereof and selectively connectible to conduit means connecting said source to one or the other of the engaging devices, the chamber also having ports intermediate its ends connected to a throttle-responsive pressure, and a pair of pistons in the chamber having a spring biasing the pistons apart, with each piston being reciprocally movable by pressure from said source entering the adjacent end port and by the opposing pressure of the spring and also throttle pressure entering the intermediate ports to regulate the release of the fluid pressure actuating the engaging device.

DESCRIPTION OF THE DRAWINGS

The invention consists of the novel transmission control system to be hereinafter described and claimed as will appear from the following description of a preferred embodiment of the invention illustrated with reference to the accompanying drawings wherein:

FIG. 1 is a longitudinal sectional view of a transmission mechanism with which the control system of the present invention is intended to be used;

FIG. 2 is a reference layout diagram for combining FIGS. 3, 4, 5, 6, and 7, illustrating the control system;

FIG. 8 is a schematic view illustrating the various operative positions of the transmission manual valve; and FIG. 9 is a schematic view illustrating the environment of the transmission of FIG. 1 with an engine and the accelerator linkages.

DESCRIPTION OF THE PREFERRED EMBODIMENT

Figure 6:
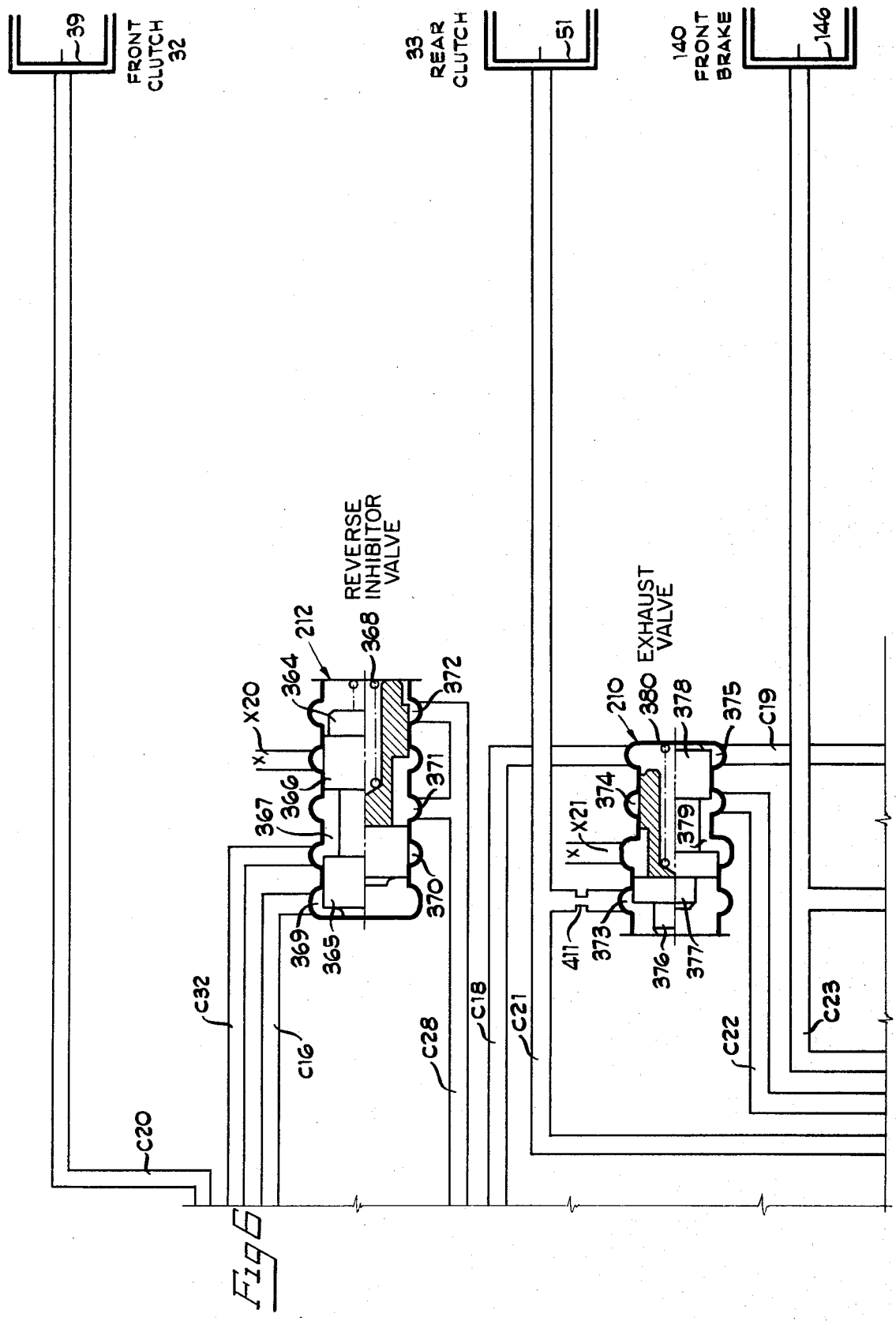

Referring to FIG. 1 of the drawings, there is shown schematically an improved planetary transmission 10 particularly suited for high-torque applications in automotive vehicles. The transmission 10 includes a transmission housing 11 in which are encased a torque converter 12, a clutch pack 13 and a planetary gear train 14.

Referring to FIG. 9, the transmission 10 is shown schematically in its environment connected to be driven by an engine 15 having a carburetor 16 with a throttle valve 17. A throttle actuator 18 is illustrated which is provided with linkage 19 connecting same to throttle valve 17. Linkage 19a is also provided connecting throttle actuator 18 with a throttle valve in the transmission, as will be later described.

The torque converter 12 includes a pump or impeller element 20 adapted to be drivingly connected to a power source such as an automotive engine. The torque converter 12 also includes a turbine member 21 connected to an input shaft 22 of the transmission. A stator or reaction element 23 is included in the torque converter interposed between the turbine 21 and impeller 20. A hollow stationar reactor shaft 25 is provided connected to the housing 11. A one-way brake 26 is provided for the stator 23 to hold the stator stationary as the turbine is driven by the impeller prior to the coupling speed being obtained within the converter at which time the stator rotates with the impeller and the turbine. Piloted on the input shaft 22 is an intermediate shaft 29. Piloted on the intermediate shaft 29 is an output shaft 30.

The clutch pack 13 includes a front clutch 32 and a rear clutch 33. An outer clutch housing 34 is provided common to each of the clutches 32, 33. The clutch 32 includes a chamber 38 defined by the clutch housing and having an annular piston 39 mounted for axial movement therein. A driven member 40 is provided for clutch 32 which is drivingly connected to the shaft 29. A series of clutch discs 45 is provided drivingly connected with the clutch housing 34. A series of clutch discs 48 is provided interleaved with the clutch discs 45 and drivingly connected to driven member 40.

The clutch 33 includes a chamber 50 defined by housing 34 and having an annular piston 51 mounted for axial movement therein. A clutch driven member 52 is provided connected to a transmission shaft 53 which is concentric with the shaft 29. A second set of clutch discs 45 and 48 are provided for the clutch 33 having the same driving relationship to the clutch housing 34 and the clutch driven member 52 as in the case of the clutch 32.

Integral with the clutch housing 34 is a common backup plate or reaction member 57 retaining the clutch discs in place when the clutch pistons are actuated to drivingly connect the clutch housing 34 to one of the driven members 40 or 52. Springs serve to return piston 39 to its disapply position when fluid pressure is exhausted from the chamber 38.

The planetary gear train 14 includes three planetary gear sets 60, 61, 62, respectively. The first planetary gear set 60 inclues a sun gear 65 formed on the shaft 53, and ring gear 66. A series of planetary pinion gears 67 mesh with the ring gear 66 and the sun gear 65. The pinion gears 67 are rotatably journalled upon a planetary carrier 68.

The second planetary gear 61 includes a sun gear 70 also formed on the shaft 53 and a ring gear 71 which is drivingly connected to the shaft 29. A series of planetary pinion gears 73 is intermeshed with the ring gear 71 and the sun gear 70. The pinion gears 73 are rotatably journalled on a planetary carrier member 74.

The third planetary gear set includes a sun gear 80 formed on the shaft 29 and a ring gear 81. A plurality of planet pinion gears 82 are provided meshed with the sun gear 80 and the ring gear 81. The planetary pinion gears 82 are rotatably journalled on a carrier member 84. The carrier member 84 is integral with the output shaft 30 and is also connected to the planetary carrier member 74 of the planetary gear set 61 and the ring gear 66 of the planetary gear set 60. The ring gear 81 is rotatably journalled on output shaft 30.

A brake mechanism 90 is provided for the ring gear 81 of planetary gear set 62. A reaction element 92 is provided fixedly connected to the housing 11 and the ring gear 81 is journalled within the reaction element 92. A one-way brake 94 is received within the reaction element 92 and engages both the reaction element 92 and the outer surface of the ring gear 81. A friction brake 100 is also provided for ring gear 81 comprising a chamber 102 formed in housing 11. Axially slidable within the chamber 102 is an annular piston 103. A series of friction discs 106 is provided drivingly connected to external splines 104 provided on ring gear 81. Interleaved with the discs 106 is a plurality of friction discs 107 which are drivingly connected with splines in the housing 11. A double Belleville spring mechanism 110 is provided within the chamber 102 adapted to return the piston 103 to the right when fluid pressure is exhausted from chamber 102. A retainer 111 is provided to hold the spring 110 in place.

A brake mechanism 120 is provided for the carrier element 68 of a planetary gear set 60. The carrier element 68 includes a drum portion 121 having splines formed thereon. A series of friction discs 124 is provided drivingly connected to housing 11 in the area of brake 120. A series of friction discs 125 is provided interleaved with discs 124 and drivingly connected to the splines on driven portion 121.

An annular brake cylinder 126 is provided rotatably fixed within the housing 11. The cylinder 126 includes a fluid chamber 127. Axially movable within the chamber 127 is an annular piston 128. Also drivingly connected to the housing 11 is a backup plate 129 for the brake 120.

A brake mechanism 140 is provided for the shaft 53 and sun gears 65 and 70 connected thereto. A brake flange 141 is provided drivingly splined to the shaft 53. A second chamber 145 is formed in the cylinder 126. Axially slidable within the chamber 145 is an annular piston 146. A reaction ring 151 is fixedly connected to the housing. A series of friction discs 153 are provided drivingly splined to the brake drive flange 141. A series of friction discs 154 is drivingly splined to reaction ring 151. A backup plate 155 is provided for the brake 140 and is fixedly connected to housing 11. A retainer 156 holds backup plate 155 in position.

The transmission mechanism herein described is adapted to provide four forward speed ratios, neutral and reverse and it is contemplated that applicant's novel fluid pressure control system be provided for the transmission. Suitable fluid passages (not illustrated) are formed in the housing and transmission parts to provide for a supply of pressure fluid when desired to each of the clutch or brake elements.

The drive ratios through the transmission are established as follows: the impeller 20 is driven by the engine and in turn drives the turbine 21 which in turn drives the input shaft 22.

First drive ratio is established by engagement of clutch 32 by fluid pressure acting on piston 39 to compress clutch discs 45 and 48. Clutch driven member 40 and intermediate shaft 29 are thus driven by the clutch 32. Shaft 29 drives the gear element 80 formed thereon. As planetary pinion gears 82 are driven by the sum gear 80 the ring gear 81 attempts to turn and one-way brake 94 is adapted to the proper direction of rotation to hold the ring gear 81 stationary. Thus, as planetary pinion gears 82 are driven by the sun gear 80, planetary pinion gears 82 and carrier 84 connected to output shaft 30 will be driven at a reduced speed ratio which, for example, in a preferred embodiment would be approximately 3.57:1.

First speed ratio may be also established as at the election of the operator when it is desired to maintain first speed ratio without automatic upshifting, by admission of fluid pressure to chamber 102 moving piston 103 to engage brake 100. The manual selection of first drive ratio including brake 100 is provided for engine braking and other special conditions where needed in the vehicle, since brake 100 provides a two-way drive. Friction brake 100 is also engaged during reverse ratio drive as will be discussed.

Assuming first speed ratio has been established automatically by means of one-way brake 94, second speed ratio is obtained by admission of fluid pressure to chamber 127 to move piston 128 and engage brake 120. Clutch 32 remains engaged. With clutch 32 engaged ring gear 71 of planetary gear set 61 is driven by the shaft 29. With brake 120 engaged carrier element 68 of the first planetary gear set 60 is held stationary thus providing a reaction element for the first planetary gear set 60. With ring gear 71 driven in a forward direction, the carrier 74 is driven in a forward direction at a reduced ratio, the carrier 74 being connected by means of carrier 84 to the output shaft 30. Ring gear 71 driving in a forward direction drives sun gear 70 and thereby sun gear 65 in the reverse direction and carrier 74 in a forward direction. Since carrier 68 is held, sun gear 65 drives ring gear 66 in the forward direction. Ring gear 66 is connected to carrier 74; therefore, the co-action of these two gear sets gives a reduced forward drive. In a preferred embodiment a 2:26:1 ratio would be established for second speed drive ratio.

Third speed forward drive ratio is established by exhausting fluid from chamber 127 of brake 120 and supplying fluid to chamber 145 to engage brake 140. When brake 140 is engaged shaft 53 and the sun gears 65 and 70 are held stationary. With the clutch 32 still engaged, ring gear 71 is driven in a forward direction and again the carrier 74 is driven in a forward direction at a reduced ratio. However, with sun gears 65 and 70 being held stationary, planetary gear set 60 has no effect and the reduction ratio of gear set 61 is utilized which is lower than that of second speed ratio as described herein. In a preferred embodiment this ratio would be approximately 1.46:1.

Fourth speed ratio is a 1:1 drive ratio and is obtained by exhausting fluid from the chamber 145 of brake 140 and supplying fluid pressure to chamber 50 of clutch 33 to engage clutch 33. With clutches 32 and 33 engaged simultaneously, the sun gear 70 and the ring gear 71 of gear set 61 are forced to rotate together thereby locking up the entire planetary gear train 14 to provide 1:1 drive ratio.

Neutral drive ratio is obtained by exhausting fluid pressure from both clutches 32 and 33, thus interrupting the drive between the engine and the gear train 14.

Reverse drive ratio is established by engagement of clutch 33 and friction brake 100. Shaft 53 and sun gear 70 are driven in the forward direction. Carrier 84 of gear set 62 is driven by carrier 74 of gear set 61. Due to the interconnections between the gear sets and the ratios of each, the net effect of driving shaft 53 in the forward direction while holding ring gear 81 is to produce drive of carrier 84 and output shaft 30 in a reverse direction at a reduced ratio.

It is believed that the construction of the transmission will be apparent from the diagrammatic illustration of FIG. 1 and that a person skilled in the art can supply the various detailed parts, such as bearings, to build an actual device; however, for an actual illustration of such detailed parts, reference can be made to copending application Ser. No. 683,414 of William M. Rich and George E. Flinn, filed Nov. 15, 1967.

The novel hydraulic control system for the transmission includes a front pump 190 connected to the impeller 20 driven by the engine of the vehicle, and is supplied with fluid from a reservoir or sump formed on the bottom interior of the transmission housing.

The hydraulic control system also includes the torque converter 12 and the following valves and control elements: manual valve 200, a throttle valve 201, a hydraulic torque converter regulator valve 202, a primary oil pressure regulator valve 203, a stall control valve 204, a 1–2 shift valve 205, a 2–3 shift valve 206, a 3–4 shift valve 207, an accumulator valve 208, a governor valve 209, an exhaust valve 210, an exhaust valve 211, a reverse inhibitor valve 212, a manual low or first speed and reverse control valve 213.

The above described valves are hereinafter referred to in abbreviated form in accordance with the following table:

MV _____ Manual valve (200).
TV _____ Throttle valve (201).
CRV _____ Converter regulator valve (202).
PRV _____ Primary regulator valve (203).
SCV _____ Stall control valve (204).
1–2V ____ 1–2 shift valve (205).
2–3V ____ 2–3 shift valve (206).
3–4V ____ 3–4 shift valve (207).
ACC _____ Accumulator (208).
GV _____ Governor valve (209).
EVI _____ Exhaust valve (210).
EVII ____ Exhaust valve (211).
RV _____ Reverse inhibitors valve (212).
CV _____ Manual low and reverse control valve (213).

The pump 190 is connected by an outlet conduit C2 to the regulator valve 203. The outlet conduit C2 of the pump is the line pressure conduit for the transmission carrying fluid pressure of a valve as regulated by the regulator valve 203.

The PRV 203 comprises a valve having ports 215, 216, 217, 218 and 219, and exhaust ports X1 and X2. The PRV has a spool valve 220 adapted to be acted upon by fluid pressure and includes a spring 221 acting on the valve element such that the pressure supplied by the pump at port 216 will be regulated depending on the influence of controlling pressures on the PRV 203. Spool valve 220 has lands 222, 223, 224, 225 and 226, with annular grooves 227, 228, 229 and 230 between the lands. Port 215 is connected to supply fluid under pressure from pump 190 to the torque converter regulator valve 202 controlling fluid flow to the converter and to a cooler 231 supplying lubricating fluid to the transmission mechanism, and to the suction line of the pump. Port 216 is connected to C2 and to port 215; port 217 is connected to C2; port 218 is connected to the stall control valve 204 via conduit C4; and port 219 is connected by conduit C5 to the manual valve 200.

The CRV 202 comprises a valve having ports 232, 233, 234, 235, 236, 237 and exhaust ports X3 and X4. The CRV has a valve spool 238 adapted to be acted upon by fluid under pressure and includes a spring 239 acting on the spool, such pressure supplied through port 233 and conduit C3 from the PRV 203 will be directed to the cooler by port 232 and to and from the torque converter via ports 234, 235, and 236 depending on the control of the fluid pressure supplied by the regulator valve PRV on the valve spool 238. The spool valve 238 has lands 241, 242, 243 and 244 with annular grooves 245, 246 and 247 between the lands. It will be seen that port 232 of the CRV is connected by conduit C6 to cooler 231 and to bypass check valve 248; ports 234 and 235 are connected by conduits C7 and C8 to direct fluid under pressure to the torque converter while port 236 receives fluid via conduit C9 from the converter; and port 237 is connected to conduit C10 and thereby to C6. The valve 248 is biased to open at 45 p.s.i. to bypass, via conduit C11, the pressure fluid around cooler 231 to the transmission lubrication line C12. A check valve 249 is connected to C11 and opens at 20 p.s.i. to direct the fluid in C11 to the pump suction line C13.

The stall control valve 204 comprises a valve having ports 251, 252, 253, 254, 255 and exhaust ports X5 and X6. The SCV 204 has a valve spool 256 adapted to be acted upon by fluid under pressure and includes a spring 410 received within a bore in the spool and biasing the spool toward the right. The spool 256 has lands 257, 258, 259 and 260 with annular grooves 261, 262, 263 between the lands.

The throttle valve 201 comprises a valve having ports 264, 265 and 266 and exhaust ports X7, X8 and X9. The TV 201 has dual valve spools 267 and 268 adapted to be moved longitudinally under the influence of an accelerator. The spool 268 has lands 269a and 269b spaced by a groove 270, and the spool 267 has lands 271, 272 and 273 with grooves 274 and 275 between the lands. A spring 276 extends between and engages the spools 267 and 268. The valve spool 267 has a cylindrical bore receiving spring 267a biasing the spool to the left.

The manual drive selector valve 200 comprises a valve having annular ports 277, 278, 279, 280, 281, 282, 283 and 284 and exhaust port X10. The MV 200 has a valve spool 285 manually operative to provide selected speed ratios, neutral or reverse and is provided with lands 286, 287, 288 and 289 spaced by grooves 290, 291, 292.

The 1–2 shift valve 205 comprises a valve having ports 293, 294, 295, 296, 297, 298, 299 and 300 and exhaust ports X11, X12 and X13. The 1–2V has dual valve spools 301 and 302, the spool 301 having lands 303, 304, 305, 306 and 307 with grooves 308, 309, 310, 311 and spool or plug 302 having a land 312 and an extension 313 of reduced diameter. A coil spring 314 surrounds the extension 313 of spool 302 and is compressed between the land 312 of spool 302 and land 307 of spool 301.

The 2–3 shift valve 206 comprises a valve having ports 319, 315, 316, 317, 318, 320, 321, 322 and 323 and exhaust ports X14, X15, X16 and X17. The 2–3V has two valve spools 324 and 325, the spool 324 having lands 326, 327, 328, 329 and 330 with grooves 331, 332, 333 and 334 and spool 325 having lands 335 and 336 with groove 337 between the lands. A spring 338 is positioned within a hollow bore in spool 324 and compressed between spool 324 and spool 325.

The 3–4 shift valve 207 comprises a valve having ports 339, 340, 341, 342, 343, 344, 345, 346, 347, 348 and 349 and exhaust ports X18 and X19. The 3–4V has two valve spools 350 and 351, the spool 350 having lands 352, 353, 353a and 354 having grooves 355, 356 and 357; the spool 351 having a main body with lands 358 and 359 with a groove 360 between the lands, and a hollow plug 361 having its cylindrical bore receiving a spring 362 biasing the plug 361 to the right and spools 350 and 351 to the left, the open end of the plug having an annular shoulder 363 located at exhaust port X19.

Referring now to the reverse inhibitor valve 212, this valve prevents the selection of reverse above a preselected governor pressure. RV 212 comprises a valve spool 364 having lands 365, 366 with a groove 367 between the lands, the spool having a cylindrical bore for a spring 368 adapted to bias the spool to the left. The RV 212 comprises a valve having ports 369, 370, 371, 372 and an exhaust port X20.

The exhaust valves 210 and 211 serve to modulate the release of the brakes 120 and 140 and to provide overlap during the 2–3 and 3–4 speed upshifts. The EVI 210 comprises a valve having ports 373, 374, 375 and exhaust port X21; a valve spool 376 having lands 377 and 378 with a groove 379 between the lands. The valve spool 376 has a cylindrical bore receiving a spring 380 biasing the spool to the left. The EVII 211 is identical to EVI 210 and is a valve having ports 381, 382 and 383 and exhaust port X22; a valve spool 384 having lands 385 and 386 has a spring 388 in a central bore therein biasing the spool to the left.

The manual low and reverse control valve 213 is provided to provide manual low or first speed only when the 1–2, 2–3, and 3–4 valves 205, 206 and 207 are in their downshifted positions, the valve 213 being biased by a spring to provide reverse. The CV 213 comprises a valve having ports 389, 390, 391, 392, 393; and a valve spool 394 provided with lands 395, 396, 397 with grooves 398 and 399 between the lands. The spool 394 has a cylindrical bore provided with a spring 400 biasing the spool to the left.

Accumulator 208 includes a bore having pistons 401 and 402 slidable therein, the pistons being provided with abutting stems 403 and 404 surrounded by a spring 405 biasing the pistons away from each other. The accumulator includes ports 406, 407, 408 and 409.

The various valves of the transmission control system are connected by a conduit structure in accordance with the following description:

As described, line pressure conduit C2 is connected to PRV 203 at ports 216 and 217, to SCV 204 at port 253, to TV 201 at port 265, to MV 200 at port 283, to 1–2V at port 298, to 2–3V at port 320, to CV 213 at port 393, and to GV 209. An orifice 409 is provided in a branch of C2 communicating with port 217 of PRV 203. A conduit C4 interconnects port 218 of PRV 203 with port 252 of SCV 204. A conduit C5 connects port 219 of PRV 203 with port 282 of MV 200. A conduit C15 connects port 283 of MV 200 with port 347 of 3–4V 207.

Governor pressure is supplied to 1–2V 205, 2–3V 206, 3–4V 207, SCV 204 and to RV 212 by regulating the line pressure in conduit C2 by the governor valve GV 209 and directing the regulated pressure via conduit C16 to port 251 of SCV 204, port 369 of RV 212, port 339 of 3–4V 207, port 314 of 2–3V 206, and via conduit C17 from port 314 to port 293 of 1–2V 205.

A conduit C18 interconnects ports 254 and 255 of SCV 204, ports 264 and 266 of TV 201, ports 348 and 349 of 3–4V 207, ports 322 and 323 of 2–3V 206, port 300 of 1–2V 205, ports 407 and 408 of accumulator 208, port 375 of EVI 210 and then via conduit C19 to port 383 of EVII 211.

A conduit C20 interconnects port 281 of MC 200, port 343 of 3–4V 207 and a chamber housing piston 39 of clutch 32. A conduit C21 interconnects port 342 of 3–4V 207, port 373 of EVI 210, and a chamber housing piston 51 of clutch 33, C21 having an orifice 410 between port 342 and the clutch piston chamber, and also an orifice 411 between C21 and port 373. It will be observed, port 374 of EVI 210 is an exhaust port connected by conduit C22 to an orificed exhaust port 345 (X18). A conduit C23 interconnects port 316 of 2–3V 206, port 381 of EVII 211 and the chamber housing piston 146 of brake 140, and to the right end of piston chamber of the accumulator 208, C23 having an orifice 412 between port 316 and port 381. It may be noted, a conduit C24 connects port 382 of EVII 211 to an exhaust port X15 of 2–3V 206. A conduit C25 interconnects port 295 of 1–2V 205, port 406 of accumulator 208 and to the chamber having piston 128 to operate brake 120. A conduit C26 interconnects port 297 of 1–2V 205 and port 389 of CV 213. A conduit C27 connects port 391 of CV 213 to the chamber having piston 103 of brake 90. A conduit C28 connects port 390 of CV 213 to ports 371 and 372 of RV 212.

A conduit C29 connects port 277 of MV 200, ports 294 and 299 of the 1–2V 205, and port 392 of CV 213, an orifice 414 being disposed between C29 and port 392 of CV 213. A conduit C30 connects port 278 of MV 200, ports 315 and 321 of the 2–3V 206. A conduit C31 connects ports 279 and 280 of MV 200 with ports 340 and 346 of 3–4V 207. A conduit C32 connects port 284 of MV 200 to port 341 of 3–4V 207 and port 370 of RV 212. A conduit C33 connects port 318 of 2–3V 206 and port 296 of 1–2V 205. A conduit C34 connects port 344 of 3–4V 207 and port 317 of 2–3V 206.

Each of the valves of the present control system has exhaust ports connected to the sump for the transmission. Each exhaust port, shown in the drawings, has a small "x" therein which is commonly used to indicate an exhaust or return to sump.

The transmission control system utilizes several pressure signals to carry out the various automatic shifting and pressure regulating functions. These are, namely, governor pressure, throttle modulator pressure and accumulator pressure.

The converter regulator valve 202 controls the converter charge pressure and directs oil to the lubrication, cooler and pump suction circuits. More particularly, excess fluid under pressure from the primary regulator valve 203 is directed through C3 to the converter feed circuit. However, return of fluid from the converter via C9 is blocked at port 236 by land 243 of valve spool 238. Initial movement of the valve spool, caused by pressure build-up on the differential area of lands 242 and 243 of spool 238 via conduit C7 and C8, allows the fluid to flow via C9 to flow to the cooler 231 via C10 then to C12 to the transmission casing for lubrication, and to the pump suction conduit C13. Further movement of the valve spool 238 and thereby land 241 to the left, allows fluid to flow from C3 via ports 233 and 232 to pass directly to C6 and to the cooler 231 and then to C12 to the transmission casing and to the pump suction conduit C13, paralleling the circuit through the converter. If the flow through cooler 231 cannot accommodate the volume of fluid available, the check valve 248 will open to provide a path via C11 to C12, bypassing cooler 231, an advantageous feature usable at high volume conditions or if the cooler flow is blocked or disconnected.

Governor valve 209 constitutes a hydraulic governor and receives fluid under pressure directly from pump 190 via C2 and produces a regulated lower fluid pressure in C16 which increases with vehicle speed since the governor mechanism is driven by the output shaft of the transmission. Thus, the pressure in C16 is referred to as "governor pressure" hereinafter and is a pressure which increases with increasing vehicle speed. The governor pressure is also admitted to port 339 of the 3–4 shift valve 207, port 319 of the 2–3 shift valve 206, and from port 319 via C17 to port 293 of the 1–2 shift valve 205. Thus, the speed responsive pressure is connected to each of the shift valves 207, 206, 205 to urge them to the right in an upshifting direction in response to increasing vehicle speed.

Governor pressure is also admitted through C16 to port 251 of the stall control valve 204 and also to port 369 of the reverse inhibitor valve 212 and functions to tend to shift these valves to the right for a purpose to be described.

Throttle valve 201 is effective to provide a throttle pressure that increases with the depression of the accelerator pedal, i.e., provides a regulated pressure proportional to the amount of carburetor opening. Fluid pressure in C18 is regulated as a function of the spring load, which is determined by the position of the valve spool 268 connected by a suitable arrangement to the carburetor throttle. It will be noted, fluid under pressure in C2 enters the throttle valve at port 265 and the regulated fluid pressure flows into port 264 and C18, with a portion flowing through orifice 420 to port 266 of the valve. The throttle regulated fluid pressure is directed by C18 to ports 254 and 255 of SCV 204, port 375 of EVI 210 and from this valve by C19 to port 383 of EVII 211; C18 to ports 348 and 349 of 3-4V 207, ports 322, 323 of 2-3V 206, port 300 of 1-2V 205, and ports 407 and 408 of accumulator 208.

The primary regulator valve 203 regulates the line pressure from the pump and the regulated pressure is applied to the pistons for the various brakes and clutches of the transmission. Line pressure in C2 is regulated at four different fixed levels by various combinations of fluid under pressure from ports 216, 217, 218 and 219 and in grooves 227, 228, 229 and 230 acting on the associated faces of lands 222, 223, 224, 225 and 226. Normal line pressure is obtained when lines C2, C4 and C5 are all pressurized. Normal stall pressure is obtained by the action of SCV 204 to the exhaust conduit C4 connecting ports 252 of SVC 204 and port 218 of PRV 203, at which time C2, connecting port 216 of PRV 203 and port 253 of SVC 204, and C5, connecting port 219 of PRV 203 and port 282 of MV 200 are both pressurized. Normal reverse pressure is provided in C2 and C4. C5 is exhausted at MV 200. Reverse stall pressure is determined by exhausting C5 and C4.

Stall control valve 204 performs an advantageous function in the control system by changing the effective output pressure from the primary regulator valve PRV 203. Throttle pressure is applied by C18 to ports 254 and 255 of the valve and thereby to groove 263 of valve spool 256 and also to the valve chamber at ther ight end of the spool. Governor pressure is applied by C2 to port 251 of the valve and into the valve chamber at the left end of the spool. Accordingly, throttle pressure and governor pressure are applied to opposite ends of the valve spool 256. Initially, before the governor pressure and vehicle speed is of a significant amount, the valve is in its left-hand position interrupting the communication between line pressure in C2, and compensator pressure in C4. This allows the primary regulator valve PRV 203 to be at its maximum position to the right which gives maximum regulated pressure. When the governor pressure and vehicle speed increase beyond a point which is determined by the amount of throttle pressure acting on the right end of SCV 204, the valve spool 256 of SCV 204 will move to the right to connect C2 and C4 to apply regulated pressure through C4 to the groove 229 of spool 220 of PRV 203, and thereby the differential areas of the faces of lands 224 and 225 of the spool 220 of PRV 203, moving the spool 220 to the left and thereby producing a reduced regulated pressure in C2. Thus, at a predetermined vehicle speed, the line pressure is cut back to a lower value.

SVC 204 provides increased line pressure during period of converter torque multiplication, because increasing spring 410 and governor pressure in C16 to move the valve spool 256 to the left to exhaust C4 throuugh port X5 of SCV 204. A hysteresis area is provided for C18 to prevent regulation and insure positive snap-action movement of the valve spool 256. More particularly, increasing governor pressure in C16 moves the valve spool 256 to the right, closing off the port 254 of the valve and the large area of the spool land 259 on which the throttle pressure works and causing a snap movement of the valve spool to cut off C4 from X5, which regulated pressure acts on PRV 203 to lower line pressure in C2. Movement of the vehicle causes sufficient increase in governor pressure to move valve spool 256 to provide normal pressure.

Manual valve 200 is provided to direct fluid to the desired hydraulic circuits to obtain transmission functions selected by the driver. MV 200 has 1–2–3–D–N–R–P positions as illustrated in the drawings with "P" representing park (transmission in neutral); "R" representing reverse (clutch 33 and brake 90 engaged); "N" representing neutral (no drive elements engaged); "D" representing drive (clutch 32 engaged, and other brakes and clutches engaged to produce forward speed ratios as determined by shift valves, with automatic upshifts and downshifts (1–4, 4–1) in proportion to throttle pressure). "3" represents automatic upshifts and downshifts (1–2–3 and 3–2–1) in proportion to throttle pressure; and, although fourth speed is not available, if the transmission is in fourth speed, when "3" is selected, an inhibited 4–3 downshift will occur as soon as road speed permits. "2" represents automatic upshifts and downshifts (1–2, and 2–1) and, although third and fourth speeds are not available, if the transmission is in fourth or third speed when "2" is selected, an inhibited 4–3 and/or 3–2 downshift will occur as soon as road speed permits. "1" is low speed and is provided by engagement of clutch 32 and brake 90 and no automatic shifts will occur, and first speed will be maintained irrespective of changes in road speed and/or throttle operation; and if the transmission is in fourth, third or second speed when "1" is selected, an inhibited 4–3, 3–2 and/or 2–1 downshift will occur as soon as road speed permits. In the "1" position, the brake 90 provides engine braking of the road wheels.

The three shift valves for obtaining the four speed ratios of the transmission are the 1–2 shift valve 205, the 2–3 shift valve 206, and the 3–4 shift valve 207. Movement of these valves causes the various clutches and brakes to be engaged and disengaged to provide the desired speed ratios. The position of each shift valve is determined by a balance of the force of its spring plus throttle pressure in C18 plus line pressure in C2 and C15 opposed by governor pressure in C16. Hysteresis, to provide snap action, is provided in C15 and C2. The various signals are provided C20 feeding to C21, C23, C25, C26 by means of conduits C34 and C33 interconnecting the shift valves. The ports in these valves are arranged so that only one signal can be produced regardless of the position of the shift valves. Normal shift sequence is 1–2–3–4 and 4–3–2–1.

Valve 213 serves to apply brake 90 for manual low speed ratio and reverse. In manual low, fluid is fed from MV 200 via C29 to port 392 of CV 213 through groove 399 of valve spool 394, port 391 to C27 and cylinder of rear brake 90 to actuated piston 103 to engage the brake. In reverse, fluid is fed from MV 200 via port 284 of MV 200, C32, port 370 of RV 212, groove 367 of valve spool 364 of RV 212, port 371, C28, port 390 of CV 213, groove 399 of spool 394 of CV 213, port 391, C27 to the cylinder of rear brake 90 to actuate piston 103 to engage the brake. An advantageous feature of the valve 213 is that, while this valve operates to connect manual low pressure in C29 to brake 90, valve 213 can only do so when all of the shift valves 205, 206 and 207 are in their downshift positions so that fluid pressure is transmitted through C26 to hold the valve spool 394 to the right. In reverse, spring 400 is operative to put the valve spool 394 in its reverse obtaining position since fluid pressure is lacking in C26 at this time.

Valves EVI 210 and EVII 211 are exhaust valves serving to modulate the release of brakes 140 and 120 to provide overlap in 2–3 and 3–4 shifts. Throttle pressure is applied to the right end of the valve spool 376 of EVI 210 via C18 and port 375, and then from port 375 to the right end of spool 384 via C19 and port 383 of spool 384 of EVII 211. The spools of each of these valves are moved to the right by line pressure in C21 and C23 when it reaches a predetermined value after the associated shift valve makes the upshift. Line pressure only acts on the spools to move it to the right only after the pressure being transmitted to the associated brake reaches a predetermined value to exhaust the brake in a manner later described.

The accumulator 208 performs five functions. On a 1–2 upshift where brake 120 is to be applied, pressure fluid is admitted at the left side of the accumulator through port 406 and C25 and urges the accumulator piston 401 to the right against the force of the spring 405 and also against the force of throttle pressure in port 407 and in C18. Thus, if the throttle pressure is of small value, the piston 401 can move further as pressure builds up in C25 and thus modulate the pressure buildup for the servomotor of brake 120. At higher throttle pressures, a faster build-up of pressure will occur in the servomotor of brake 120, since movement of the accumulator piston 401 to the right is resisted with increased force. On the 2–3 shift, applied pressure in C23 is admitted to the accumulator at the right end thereof and will delay application of the servomotor for brake 140. The amount of delay on this shift depends on the force of the spring 405 in the accumulator, the value of the throttle pressure and the length of time that pressure exists in C25. Pressure in C25 is open urging the accumulator pistons 401 and 402 to the right and thus, depending upon how fast C25 is exhausted, the amount of delay of the application of servomotor of brake 140 will be varied. On 3–4 upshifts the accumulator will act to retain brake 140 on due to the storing effect of pressure in the accumulator which will thus delay reelase of brake 140 until clutch 33 is applied. On the 4–3 downshift, the accumulator will again operate to modulate the pressure for application of the servomotor of brake 140. This time pressure in C23 acting on the accumulator piston 402 is resisted only by the spring and the throttle pressure in C18 since C25 is previously exhausted. On the 3–2 downshift, pressure fluid is admitted to C25 to apply the servomotor of brake 120. Movement of the accumulator piston 401 to the right, by the pressure of fluid in C25, is resisted by the spring, throttle pressure, and also the pressure in C23. Thus, the amount of delay in release of the servomotor for brake 140 will be varied by the speed with which pressure is exhausted from C23 on the 3–2 downshift.

Reverse inhibitor valve 212 functions to prevent the selection and obtaining of reverse above a preselected governor pressure. Governor pressure is applied via C16 to port 369 of RV 212 and the left end of valve spool 364 to keep the spool shifted to the right to prevent line pressure in C32 entering port 370 and flow through groove 367 of the spool to port 371, C28 to port 390 of CV 213 to apply brake 90 when MV 200 is in any of its forward drive positions in which clutch 32 is applied. As long as the car proceeds in a forward direction, a predetermined governor pressure is applied to RV 212. However, with the car at a standstill, or moving forward at a speed to prevent governor pressure actuating RV 212, fluid pressure in C32 flows through valve 212, C28, ports 390 and 391 of CV 213, C27 to actuate the servomotor of brake 90.

In the operation of the transmission, the pump provides a regulated fluid pressure for the hydraulic torque converter 12 and to the manual valve MV 200. Operation of the transmission in the various 1–2–3–D–N–R–P positions of MV 200 is as follows:

When MV 200 is in the "N" or neutral position, regulated line pressure in C2 enters port 283 of MV 200 and groove 292 of spool, and flows through C15 where it is blocked by 3–4V 207. Line pressure in C2 flows to the 2–3V 206 and 1–2V 205 and is blocked by their valve spools 324 and 301. Also, line pressure in C2 flows to the right end of chamber housing valve spool 394 of CV 213 to assist spring 400 to position the spool to the left. Line pressure is not communicated to any of the friction clutches or brakes of the transmission and the transmission is in a neutral position.

When selector valve spool 285 of MV 200 is moved to the "D" position, line pressure from C2 will be connected at port 283 of MV 200 to flow around groove 292 of spool 285 and into port 281 and, via C20, to the servomotor 39 of the front clutch 32 to engage the clutch. Also, line pressure is fed via C20 to port 343 of 3–4V and around groove 357 of the valve spool 350 of 3–4V to C34 connected to port 317 of 2–3V and around groove 333 of the spool 324 of 2–3V to C33 connected to port 296 of 1–2V and around groove 310 of spool 301 of 1–2V and then to port 297 and C26 to port 389 and valve chamber of CV 213. When clutch 32 engages, first or low speed drive is established in the transmission mechanism as the free wheel brake 94 engages at this time.

The vehicle will remain in first speed ratio until 1–2V 205 moves to the right or its upshifted position, i.e., its upper position illustrated in the drawings. Governor pressure is admitted via C16 to port 314 of 2–3V 206 and through C17 to port 293 of 1–2V 205 and acts on the end of spool 301 tending to move the spool 301 to its upper or second speed position to establish second speed ratio. Resisting movement of the spool 301 is the spring 314 between spool 301 and plug 302, also throttle pressure acting on the plug 302 via port 300 and C18 to move the plug and spool to the left or its downshifted position. Line pressure from C2 at 298 also resists this movement. As the governor pressure overcomes throttle pressure, line pressure at 298 and spring 314 in 1–2V, the valve spool 301 is moved to its second speed position in which line pressure in C26 is exhausted through port 297 of 1–2V, groove 310 of 1–2V and exhaust port X12, and line pressure in C33 enters port 296, flows through groove 309 and port 295 of 1–2V and to C25 to the servomotor 128 of brake 120 and also flows from C25 to port 406 of accumulator 401. It will be noted throttle pressure in C18 and entering ports 407 and 408 acts on the accumulator pistons 401 and 402, throttle pressure thus acting in opposition to the fluid pressure at the left end of the piston 401 to control the fluid pressure in C25 to vary or delay the build-up of pressure on the servomotor 128 of brake 120 to provide a smooth engagement of brake 120 in the manner of operation of the accumulator as previously described.

Third speed ratio is obtained by movement of the spools 324 and 325 of 2–3V 206 to their upper position shown in the drawings. As the governor pressure in C16 acting on spool 324 of 2–3V 206 increases and overcomes throttle pressure acting on spool 325 the spring 338 and line pressure in port 320, the 2–3V 206 is shifted to its third speed position. In this position, line pressure is exhausted from C25, accumulator 208 and brake 120 via ports 295 and 296 of 1–2V 205, C33, and port 318, and orifice exhaust line X15 of 2–3V of 206. At the same time, line pressure in C34 flows into port 317, groove 332 of spool 324, port 316, C23 to the brake 140 to provide third speed, line pressure is fed via C23 to the right end of the chamber housing the pistons of the accumulator 208 to move the pistons to the position shown, and line presure from C23 also flows through the orifice 412 and port 381 of EVII 211 and tends to move the spool 384 of EVII 211 to the right resisting movement of the spring 388 and throttle pressure acting on the right end of spool 384. When the servomotor of brake 140 has operated to engage brake 140, the spool 384 of EVII 211 shifts to its lower position, shown in the drawings, to fully open C24 to exhaust X22 via 387 of EVII 211. This described operation of EVII 211 serves to modulate the release of brake 120 and engagement of brake 140 to provide an overlap and smooth transition in the second to third speed shift.

Fourth speed ratio is provided by movement of the spools 350 and 351 of the 3–4 shift valve 207 to their upper position shown in the drawings. This movement of the spools occurs when the governor pressure in C16, acting on spool 350, increases to an extent greater than throttle pressure in C18 acting on spool 351. In this position of the spool 350, fluid is exhausted from C23, the chamber at the right end of accumulator 401, and brake 140 via port 316 of 2–3V 206, groove 332 of spool 324, port 317, C34, port 344 of 3–4V 207 and through the orificed exhaust line X18 to the transmission sump, fluid in the chamber at the left end of EVII 211 exhausts through the orifice 412 to C23 so that spool 384 of EVII 211 is returned to its upper position, shown in the drawings, by the spring 388 and throttle pressure. At the same time, regulated line pressure in C20 at port 343 of 3–4V 207 is connected through groove 342 of spool 350 to C21 and thereby to the servomotor of clutch 33 to engage clutch 33 to provide fourth speed ratio. Also, when the servomotor of clutch 33 is fully operative engaging clutch 33, line pressure in C21 and connected to the left end of the chamber holding spool 376 of EVI 210 via the orifice 411 and port 373, moves the speel 376 to the right against the resistance of spring 380 and throttle pressure. This movement of valve spool 376 opens C22 to drain through port 374 of EVI 210, groove 379 of spool 376 and X21 to the transmission sump. It will be seen that the described operation of EVI 210 produces a modulated pressure in the release of brake 140 and engagement of clutch 33 affording a smooth transition in the change from third speed ratio to fourth speed ratio.

The transmission will remain in its upshifted fourth speed position until the vehicle speed drops such that the 3–4V 207 will again be moved to its downshifted position to establish third speed ratio. This may occur due to decrease in vehicle speed and governor pressure in C16 or due to increased throttle modulator pressure in conduit C18. The shift valves are interrelated such that the shift valves downshift in the reverse order of the upshifts in that 3–4V 207 will downshift first, 2–3V 206 next and 1–2V 205 last.

Reverse is obtained by movement of the spool 285 of manual valve MV 200 to the "R" position when line pressure in C2 enters port 283 of MV 200 and groove 292 of spool 285, and flows into port 284 and C32 to port 370 of RV 212, groove 367 of spool 364, port 371 and, via C28, to port 372 and groove 364 of spool 364 to cooperate with spring 368 to maintain spool 364 in its upper position shown in the drawings and to prevent governor pressure in C16 and port 369 closing port 370, and also via C28 to port 390 of CV 213, groove 399 of spool 394, port 391, C27 to the servomotor 103 of brake 90 to engage brake 90. Line pressure in C32 also is connected to port 341 of 3–4V 207, groove 356 of spool 360, port 342, C21 (and its orifice 410), to the servomotor 51 of clutch 33 to engage clutch 33. It will be noted line pressure in C2 enters port 393 of CV 213 and assists spring 400 in urging and maintaining the spool 394 in the lower position shown in the drawings during the establishment of reverse.

When the manual valve MV 200 has its spool 285 in the third speed or "3" position, line pressure in C2 enters port 283 of MV 200 and groove 292 of spool 285, and flows into C15; also port 281 and C20; port 280 and C31. Line pressure also flows from port 282 in MV 200 to C5 and port 219 of PRV 203. Line pressure in C20 operates servomotor 39 of clutch 32 to engage clutch 32. Line pressure in C31 is connected to ports 340 and 346 of 3–4V 207 and acts on land 354 of valve spool 324 of the valve to cause an inhibited downshift from 4–3 and the line pressure in port 340 acts on the land 352 of the valve spool to prevent a 3–4 upshift. The 1–2 and 2–3 upshifts are normal. 3–2 and 2–1 shifts are also normal.

When the manual valve MV 200 has its spool 285 in the second speed or "2" position, line pressure acts on the 3–4 valve, as explained above, to its "3" position, and, in addition, line pressure is now in C30 via port 282, valve spool 285, and ports 280, 279 of MV 200 to C30 and ports 321 and 315 of the 2–3V 206. Line pressure acts on land 330 of spool 324 of 2–3V 206 to cause an inhibited 2–3 downshift. Line pressure in port 315 of the 2–3V acts on land 326 of the spool 324 of 2–3V to prevent upshifts 2–3 and maintain it in its "2" position and thereby the transmission in second speed ratio. The 1–2 shifts and the 2–1 shifts are normal.

When the manual valve is moved to the first speed or "1" position, line pressure is in C30, C31, C20 and C5, acts in C30, C31, C20 and C5 to maintain valves 3–4V 207 and 2–3V 206 in downshifted position, acting on these valves as described above. Line pressure is also provided in C29 via C2, port 283, 277 and the MV 200. Line pressure in C29 enters ports 294 and 299 of 1–2V 205 and via 299, acts on land and 307 of spool 301 to cause an inhibited 2–1 downshift and, via port 294, acts on land 303 of spool 301 to prevent an upshift from first to second speed position.

With the manual valve MV 200 in the "1" position and 1–2V 205 held in its downshifted position, it should be particularly noted that tline pressure in C29 also flows via orifice 414 to port 392 of CV 213, groove 399 of spool 394, port 391, C27, to the servomotor of brake 90 to provide drive through the two-way brake 90 to provide engine braking. The CV 213 is in its right-hand position because, as the 3–4V 207, 2–3V 206 and 1–2V 205 in their downshifted positions, line pressure from C2 and flowing through C20, groove 357 of spool 350 of 3–4V 207, C34, groove 333 of spool 324 of 2–3V 206, C33, groove 310 of spool 301 of 1–2V 205 and C26 to port 389 of CV 213 and enters the left end of chamber CV 213 to maintain the spool 394 of CV 213 in its right-hand position. Thus, the manual low speed or "1" position of the transmission can be accomplished by the CV 213 operating to connect line pressure in C29 to the servomotor 103 of brake 90 only when all of the shift valves 1–2V 205, 2–3V 206 and 3–4V 207, are in their downshifted position whereby line pressure is transmitted to C26 to hold the CV 213 to the right for insuring first speed is operative.

Various features of the invention have been particularly shown and described; however, it should be obvious to one skilled in the art that modifications may be made therein without departing from the scope of the invention.

What is claimed is:

1. A hydraulic control system for a transmission having
   a source of fluid under pressure,
   a first fluid pressure operated engaging device to establish a first low speed ratio,
   a control valve having a shifted position wherein said control valve connects said source to said first engaging device,
   a second fluid pressure operated engaging device to establish a higher speed ratio,
   a shift valve having a first condition connecting said source to said second device to engage said second device and having a second condition disconnecting said source from said second device and connecting said source to said control valve to place said control valve in said shifted position, and
   a manual valve having a first position connecting said source to said shift valve, in said first condition thereof, and thereby to said second device, said manual valve being movable to a second position to connect said source to said control valve and thereby to said first device to engage said first device when said control valve is in said shifted position.

2. A hydraulic control system as claimed in claim 1 wherein governor means are connected to said source and to said shift valve, said governor means produces a governor pressure responsive to vehicle speed and connected with said shift valve and supplies governor pressure to apply a force to one end of said shift valve to move said shift valve to a position connecting said source to said second engaging device.

3. A hydraulic control system as claimed in claim 2 wherein throttle means are connected to said source and to said shift valve, said throttle means producing a fluid pressure responsive to the operative position of the throttle and supplying this pressure to the other end of said shift valve to provide a force on said shift valve in opposition to said force produced by said governor pressure.

4. A hydraulic control system as claimed in claim 1 wherein said shift valve is provided with lands exposed to pressure from said source in the second position of said manual valve to maintain said shift valve in said second condition.

5. A hydraulic control system as claimed in claim 1 wherein in said first position of said manual valve, said source is connected to one end of said control valve to move said control valve to another position preventing connection of said source to said first device.

6. A hydraulic control system as claimed in claim 1 wherein a conduit connects said source through said control valve to said first device and a restriction is provided in said conduit for slowing engagement and disengagement of said first device.

7. A hydraulic control system for an automatic transmission of an automotive vehicle having a plurality of speed ratios, a plurality of fluid pressure actuated engaging devices connected to said transmission for establishing the various speed ratios through the transmission, a source of fluid pressure for supplying fluid to said devices, a plurality of shift valves connected between said source and said devices, said shift valves each having an upshifted position and a downshifted position and being effective to cause the application of a device for either establishing a higher speed ratio or a lower speed ratio respectively in said positions, means for automatically moving said shift valves to said positions including a throttle valve movable to provide a throttle-responsive fluid pressure to one end of each of said shift valves for actuation thereof to said downshifted position, a governor valve responsive to vehicle speed to provide governor pressure applied to the other end of each shift valve for actuation thereof to said upshifted position, said shift valves being connected in series to said fluid source in the order of decreasing speed ratio or increasing speed ratio, said shift valves controlling the higher speed ratios being effective to cut off fluid pressure to the shift valves controlling the lower speed ratios and thereby prevent engagement of more than one speed ratio through the transmission at one time, a fluid pressure operated friction device connected to said transmission to establish a low speed ratio, a control valve having a shifted position wherein said control valve connects said source to said friction device, a manual valve moveable to a first position connecting said source to said shift valves and thereby to said engaging devices during upshifting and downshifting by operation of governor pressure and throttle pressure applied to said shift valves, and movable to a second position to disconnect said source from said engaging devices in the downshifted positions of said shift valves, to connect said source to said control valve to shift said control valve to connect said source to said friction device.

8. A hydraulic control system as claimed in claim 7 wherein in said second position of said manual valve, one of said downshifted shift valves controls connection of said source to said control valve to shift said control valve and has lands exposed to and acted on by pressure from said source to prevent movement to an upshifted position.

9. A hydraulic control system as claimed in claim 1 wherein urging means is provided acting on said control valve tending to prevent movement of said control valve to said upshifted position.

10. A transmission for an automotive vehicle having an engine with a throttle and a throttle actuator, a drive and driven shaft, means providing first, second and third speed ratio power trains between said shafts and including a plurality of fluid pressure actuated friction engaging devices for completing the power trains, a source of fluid pressure to operate said devices, a first shift valve for causing changes between the first and second power trains and having low and high speed ratio positions, a second shift valve for causing changes between the second and third speed power trains and having low and high speed ratio positions, means responsive to movement of said throttle actuator to modulate fluid pressure from said source and apply the modulated pressure to one end of each valve and tending to move the valve to its low speed position, governor means responsive to the speed of said driven shaft and operative to modulate fluid pressure from said source and apply the modulated pressure to the other end of each valve for actuation thereof to its high speed position, and an accumulator device connected to a plurality of said friction devices and said throttle actuator-modulated fluid pressure, whereby said accumulator is responsive to fluid pressure from said source and applied to said friction devices and also responsive to throttle actuator-modulated fluid pressure to vary the rate of build-up on reduction of applying force of fluid pressure on said friction-engaging devices.

11. A transmission for an automatic vehicle having an engine provided with a throttle and a throttle actuator, a drive shaft, a driven shaft, means providing low and intermediate and high speed ratio power trains between said shafts and including first and second fluid pressure actuated friction-engaging devices for completing the intermediate and high speed power trains, a source of fluid pressure, a first shift valve controlling fluid pressure from said source to said first device for causing changes between the low and intermediate speed ratios and having an upshifted and a downshifted position, first passage means between said first valve and first device, a second shift valve controlling fluid pressure from said source to said second device for causing changes between intermediate and high speed ratios and having an upshifted and a downshifted position, second passage means between said second shift valve and second device, a throttle valve connected to said source and to the throttle actuator for providing a modulated fluid pressure that varies directly with the throttle actuator position, third passage means connected to said throttle valve and to one end of each shift valve and tending to move the shift valve to downshifted position, a hydraulic governor connected to said source of pressure and driven by said driven shaft and providing a governor output pressure that increases with driven shaft speed and is connected to the other end of each shift valve tending to move the shift valves to their upshifted positions, an accumulator having a chamber provided with a first port at one end thereof connected to said first passage means and a second port at the other end thereof connected to said second passage means, first and second pistons in said chamber and responsive to fluid pressure in said first and second ports, a spring between said pistons and urging said pistons from each other and toward said ports, and spaced third and fourth ports between the ends of said chamber and connected to said third passage means to provide throttle modulated fluid pressure between said pistons and to adjacent ends of said pistons.

12. A transmission for an automatic vehicle having an engine provided with a throttle and a throttle actuator, a drive shaft, a driven shaft, means providing low and intermediate and high speed ratio power trains between said shafts and including first and second fluid pressure actuated friction-engaging devices for completing the intermediate and high speed power trains, a source of fluid pressure, a first shift valve controlling fluid pressure from said source to said first device for causing changes between the low and intermediate speed ratios and having an upshifted and downshifted position, first passage means between said first valve and first device, a second shift valve controlling fluid pressure from said source to said second device for causing changes between intermediate and high speed ratios and having an upshifted and a downshifted position, second passage means between said second shift valve and second device, a throttle valve connected to said source and to the throttle actuator for providing a modulated fluid pressure that varies directly with the throttle actuator position, third passage means connected to said throttle valve and to one end of each shift valve and tending to move the shift valve to downshifted position, a hydraulic governor connected to said source of pressure and driven by said driven shaft and providing a governor output pressure that increases with driven shaft speed, and is connected to the other end of each shift valve tending to move the shift valve to upshifted position, an accumulator having a chamber provided with first and second pistons movable longitudinally of said chamber, a spring between and urging said pistons apart and toward the ends of said chamber, a first port at one end of said chamber and connected to said first passage means and providing fluid pressure to said first piston to urge said first piston toward the other end of said chamber upon movement of said first valve to its upshifted position and application of fluid pressure to said first device, a second port at the other end of said chamber and connected to said second passage means and providing fluid pressure to said second piston to urge said pistons toward said first port upon movement of said second shift valve to its upshifted position and application of fluid pressure to said second device, spaced third and fourth ports between said first and second ports and connected to said third passage, means to apply throttle modulated fluid pressure to said pistons whereby the rate of build-up or reduction of engaging fluid pressure on the device from the upshifted or downshifted valve is varied under the control of said throttle pressure.

13. A transmission for an automotive vehicle having an engine with a throttle and throttle actuator, a drive and a driven shaft, drive completing means between said shafts and including a fluid pressure operated engaging device, a source of fluid under pressure and connected to said engaging device, a regulator valve for regulating the fluid pressure applied to said engaging device and having a chamber connected to said source, a valve element in said chamber and controlling the exhaust of fluid from said valve to an exhaust conduit to regulate the pressure of said source, biasing means engaging said valve element to move said valve element in an exhaust conduit closing direction, said valve element having a plurality of lands, conduit means supplying fluid pressure to said valve lands to move said valve element to an exhaust conduit opening direction, a hydraulic governor driven by said source and providing a governor output pressure increasing with driven shaft speed, a throttle valve connected to said throttle actuator and to said source for providing a pressure varying directly with the throttle actuator position, a control valve for changing the effective output pressure from the regulator valve to said engaging device and having a chamber, a valve spool in said chamber and having lands, said chamber being provided with first and second ports at opposite ends thereof respectively receiving governor pressure and throttle modulated pressure tending to move said valve spool in opposite directions, said chamber having a third port connected to said source and connectible, by movement of said valve spool with a snap-action by said spring and predetermined governor pressure in one direction to a fourth port of said chamber connected to said regulator valve to provide pressure acting on one of said regulator valve lands to urge said valve element toward said opening direction.

14. A transmission as defined in claim 13 wherein said drive completing means includes a hydrodynamic coupling device, and said exhaust conduit supplies fluid under pressure, varying with movement of said regulator valve, to said coupling device.

15. A transmission for an automotive vehicle having an engine with a throttle and throttle actuator, a drive and a driven shaft, drive completing means between said shafts and including a fluid pressure operated engaging device, a source of fluid under pressure and connected to said engaging device, a regulator valve for regulating the fluid pressure applied to said engaging device and having a chamber connected to said source, a valve element in said chamber and controlling the exhaust of fluid from said valve to an exhaust conduit to regulate the pressure of said source, biasing means engaging said valve element to move said valve element in an exhaust conduit closing direction, said valve element having a plurality of lands, conduit means supply fluid pressure to said valve lands to move said valve element to an exhaust conduit opening direction, a hydraulic governor driven by said driven shaft, and having a valve connected to said source and providing a governor output pressure increasing with driven shaft speed, a throttle valve connected to said throttle actuator and to said source for providing a pressure varying directly with the throttle actuator position, a control valve having a chamber provided with ports between the ends thereof and including a first port connected to said pressure source, a second exhaust port, a third port between said first and second ports and connected to a land of said regulator valve element, and a valve spool movable in siad chamber and having lands between the ends thereof defining a groove connecting said first port to said third port in one position of the spool or connecting said third port to said second port in the other position of said spool, said chamber having a fourth and fifth port at one end thereof for the application of throttle pressure to spool lands of said spool to move said spool to its said one position to connect said second port to said third port, a spring biasing said spool to said other position, said chamber having a sixth port at one end thereof for governor pressure to move said valve spool to its said other position and, upon closing said fourth port to throttle pressure, providing a snap-action of said spool to its said other position.

16. A transmission as defined in claim 15 wherein said drive completing means includes a hydrodynamic coupling device, and said exhaust conduit supplies fluid under pressure, varying with movement of said regulator valve, to said coupling device.

References Cited
UNITED STATES PATENTS

| | | | |
|---|---|---|---|
| 2,896,468 | 7/1959 | Cheek et al. | 74—869 |
| 3,118,320 | 1/1964 | Ivey | 74—869 |
| 3,146,630 | 9/1964 | Ivey | 74—869 |
| 3,369,430 | 2/1968 | Haley | 74—752 |

ARTHUR T. McKEON, Primary Examiner

U.S. Cl. X.R.

74—759 (Discl)